No. 655,134. Patented July 31, 1900.
C. A. TRIPP.
METHOD OF MAKING PRINTING SURFACES.
(Application filed Feb. 5, 1900.)

(No Model.)

Witnesses
Jno. Innis
Gladys L. Thompson.

Inventor
C. A. Tripp
by R. L. & A. B. Lacey his Attorneys

THE NORRIS PETERS CO., PHOTO-LITHO., WASHINGTON, D. C.

UNITED STATES PATENT OFFICE.

CHARLES A. TRIPP, OF HUDSON, MASSACHUSETTS.

METHOD OF MAKING PRINTING-SURFACES.

SPECIFICATION forming part of Letters Patent No. 655,134, dated July 31, 1900.

Application filed February 5, 1900. Serial No. 4,014. (No specimens.)

*To all whom it may concern:*

Be it known that I, CHARLES A. TRIPP, a citizen of the United States, residing at Hudson, in the county of Middlesex and State of Massachusetts, have invented certain new and useful Improvements in Methods of Making Printing-Surfaces; and I do hereby declare the following to be a full, clear, and exact description of the invention, such as will enable others skilled in the art to which it appertains to make and use the same.

This invention relates to the method of producing printing-surfaces principally used in connection with water-color inks in order to insure solid printing and which have the letter, design, or character to be printed in solid outline and the space between the outline filled in with felt or like ink-absorbing material.

In practicing the invention a matrix or mold of the design, character, or the like is constructed in any of the well-known ways. Pieces of felt, textile, or like ink-absorbing material of less dimensions each way than the actual printing-surface are placed in the mold, so as to leave a margin. The material to form the base or body of the printing type or surface is pressed into or supplied to the mold and simultaneously assumes the required shape and adheres to the absorbent material, the marginal portion surrounding the felt being integral with the base and sustaining the pressure and wear when the printing is executing.

Figure 1:
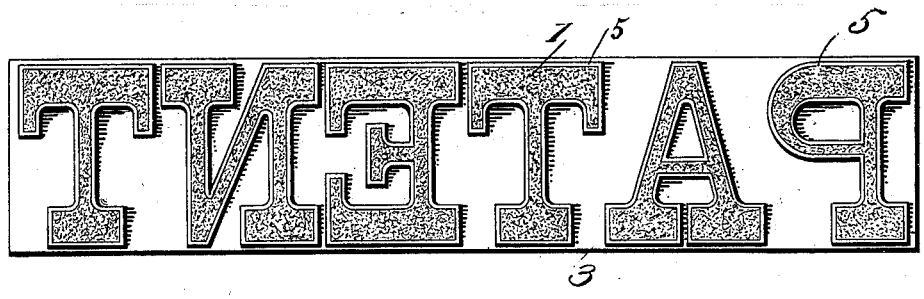
Figure 2:
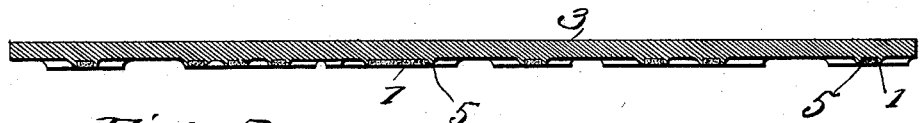
Figure 5:
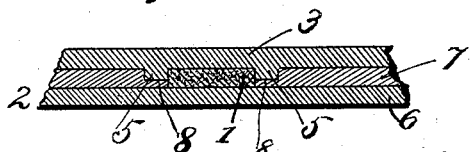
Figure 3:
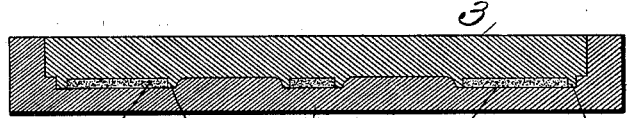
Figure 4:
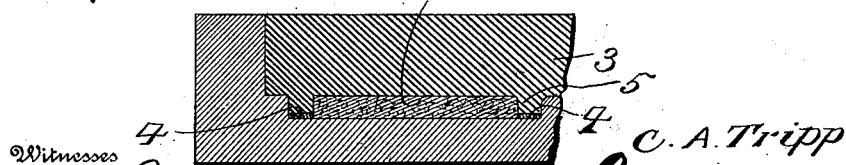

In the drawings, Figure 1 is a plan view of a printing-surface constructed in accordance with the invention. Fig. 2 is a section thereof. Fig. 3 is a detail sectional view of a matrix, illustrating the method of operation. Fig. 4 is a detail view showing the manner of constructing a printing-surface, with the felt or absorbent projecting slightly beyond the surface of the marginal portions. Fig. 5 is a detail view showing the invention effected by the chalk-plate-engraving process.

Corresponding and like parts are referred to in the following description and indicated in all the views of the drawings by the same reference characters.

The letter, character, design, or figure forming a pattern for the type or printing-surface to be constructed is utilized for the construction of a mold or matrix in any of the well-known ways. Pieces of felt, textile, or like ink-absorbing material 1 are placed in the mold 2, care being exercised to have them of less extent in every direction than the extent of the actual printing-surface, so as to leave a marginal space for the reception of the material constituting the base or body of the type. The material to form the body or base 3 of the type or printing-surface is pressed, poured, or otherwise supplied to the mold and flows over and around the felt and completely fills the mold. The plastic or fluid condition of the material forming the base when supplied to the mold causes it to adhere to the felt and fill every portion of the mold. The marginal portion 5, surrounding the felt, receives the wear and pressure when printing and prevents the packing of the felt. When the base or body is of rubber, the latter is vulcanized while under pressure, the vulcanizing process hardening the rubber and causing it to adhere to the felt by fusion.

In some cases it is found necessary to have the felt project beyond the marginal portion in order to allow for the packing of the felt and also the shrinkage from wetting. To accomplish this, after the felt has been placed in the mold liquid plaster-of-paris or any like material is poured around the edges of the felt to a depth of from one thirty-second to one-sixteenth of an inch, as shown at 4 in Fig. 4, and then the rubber or metal run into the mold as before.

In using this process in connection with the chalk-plate-engraving process, as shown in Fig. 5, the chalk 7, applied to the plate 6, is cut clear through to the surface of the plate only where it is desired to place the felt 1. To form the marginal portions 5, the chalk is not cut through to the surface of the plate 6, as shown at 8, which is about one thirty-second of an inch thick to correspond with the thickness of felt to be left projecting beyond the face of the part 5 to allow for packing. The part 7, with the part 6, constitutes the matrix 2, carrying the design for forming the type 3.

Having thus described the invention, what is claimed as new is—

1. The process of forming a type or printing-surface which consists in supplying to the matrix carrying the design, pieces of ink-absorbing material of less dimensions than the actual printing surface or design, then filling the matrix with a plastic composition which simultaneously adheres to the felt and flows about the edges thereof forming marginal protecting portions, substantially as described.

2. The process of forming a type or printing-surface which consists in supplying to the matrix carrying the design, pieces of ink-absorbing material of less dimensions than the actual printing surface or design, then pressing rubber into the matrix and vulcanizing it while under pressure, whereby the rubber is hardened and caused to adhere by a fused joint to the felt, substantially as specified.

3. The process of forming a type or printing-surface which consists in supplying to the matrix carrying the design pieces of ink-absorbing material of less dimensions than the actual printing surface or design, then partly filling the space around the said pieces of ink-absorbing material with a spacing material to a depth less than the thickness of said pieces, then filling the matrix and the remainder of the space around the ink-absorbing pieces with the material to form the base or body of the type, substantially as described.

In testimony whereof I affix my signature in presence of two witnesses.

CHARLES A. TRIPP. [L. S.]

Witnesses:
WM. M. GRAHAM,
CARRIE E. MOSHER.